United States Patent Office 3,358,619
Patented Dec. 19, 1967

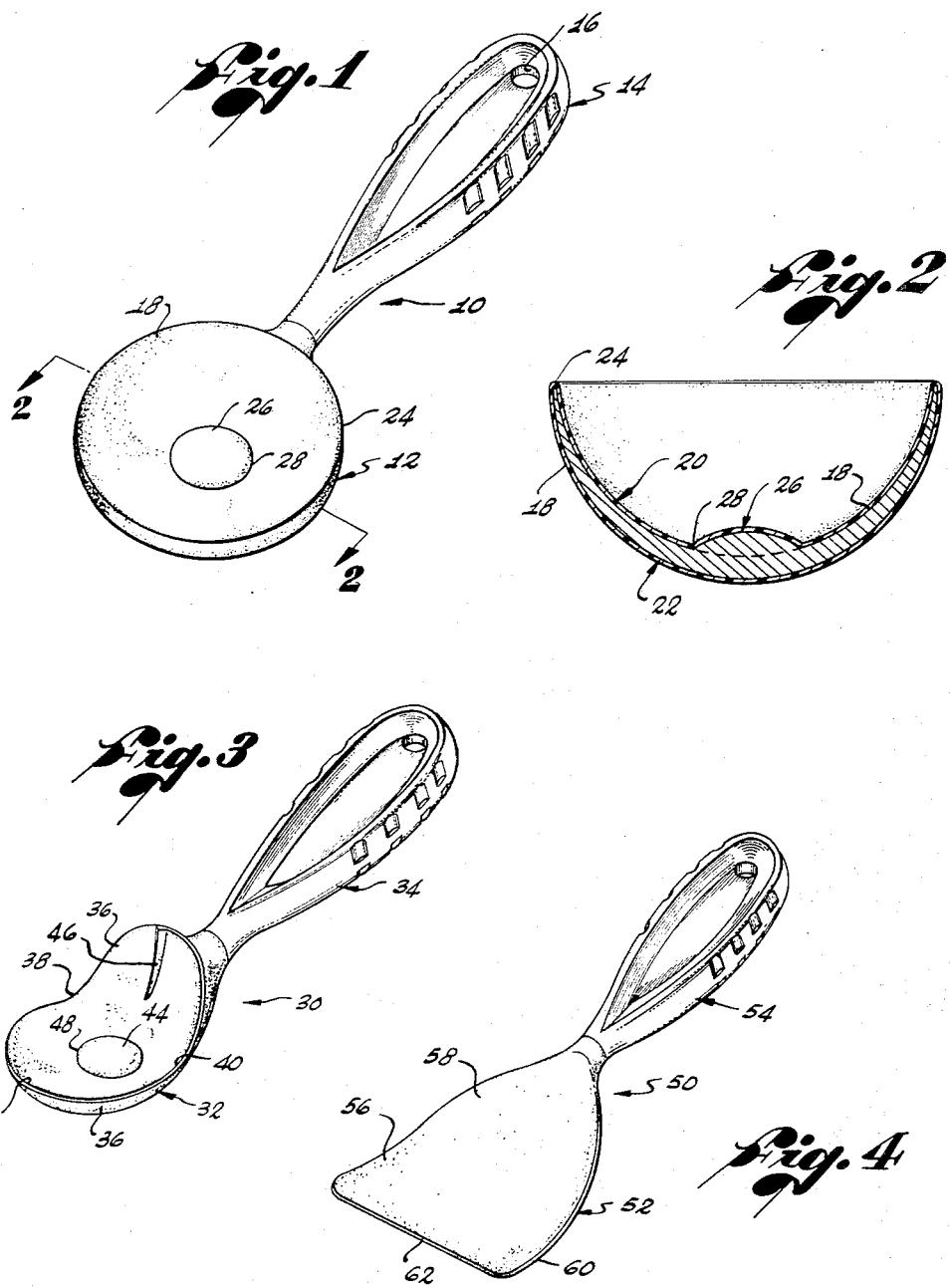

3,358,619
KITCHEN UTENSILS FOR HANDLING AND DISPENSING ICE CREAM AND THE LIKE
Herbert E. Pareira, 550 S. Barrington Ave.,
Los Angeles, Calif. 90049
Filed Aug. 18, 1964, Ser. No. 390,402
5 Claims. (Cl. 107—48)

My present invention relates to kitchen utensils and, more particularly, to improvements in utensils for handling and dispensing ice cream and the like of the type described in my co-pending patent application, Teflon Hardware Items, Ser. No. 343,790, filed Feb. 6, 1964, and now abandoned.

Any housewife, or, for that matter, anyone who has ever scooped ice cream from a carton for serving in individual portions is, I am sure, fully aware of the sticky, adherent nature of ice cream, ice milk and the like to the surfaces of scoops, spades, and other utensils commonly employed in the handling and dispensing of ice cream. No matter how carefully the utensils are employed, after several scoops they are incrusted with ice cream which must be scraped or washed from their surfaces. Needless to say, the sticky nature of ice cream materially interferes with its effective dispensing and handling and is a most annoying characteristic.

In the past, attempts have been made to counteract the sticky character of ice cream by providing utensils, such as scoops, with mechanical hand-operable wiper blades. Unfortunately, such arrangements materially increase the overall cost of the associated utensil and, what is even more disappointing, have not provided an effective solution to the problem.

In view of the foregoing, it is an object of my invention to provide an improved, low cost kitchen utensil for handling and dispensing ice cream and the like.

It is another object of my invention to provide a kitchen utensil for handling and dispensing ice cream and the like having working surfaces to which ice cream does not stick or become incrusted even after relatively long periods of use.

It is a further object of my invention to provide a kitchen utensil of the foregoing type which does not require or utilize mechanical wiper blades.

It is still another object of my invention to provide a kitchen utensil of the foregoing type which is equally useful in the handling and dispensing of hot foodstuffs.

The foregoing as well as other objects and advantages of my invention may be more clearly understood by reference to the following detailed description and drawing which illustrates by way of example preferred embodiments of the kitchen utensils comprising my invention.

In the drawing:

FIGURE 1 is a perspective view of one form of ice cream scoop constructed in accordance with my invention;

FIGURE 2 is a sectional view along the line 2—2 in FIGURE 1 illustrating the inner construction of the head portion of the scoop shown in FIGURE 1;

FIGURE 3 is a perspective view of another form of ice cream scoop constructed in accordance with my invention; and FIGURE 4 is a perspective view of an ice cream handling spade also constructed in accordance with features of my invention.

To accomplish the foregoing as well as other objects, my invention, in general, provides kitchen utensils having heads of various designs, each with opposing generally concave and convex, inner and outer polytetrafluoroethylene work surfaces. Polytetrafluoroethylene is commonly known in the trade under the trade name "Teflon" and will hereinafter be referred to by the name Teflon.

The non-adhesive, non-adherent nature of Teflon to warm substances such as heated foodstuffs is well-known. This characteristic has led to the use of Teflon coatings for the cooking surfaces of such kitchen utensils as frying pans to provide greaseless cookware. By my invention, however, Teflon has been found to provide a superior, non-stick surface preventing the adherence and allowing the free release of ice cream, ice milk and the like. Accordingly, in my invention, Teflon in different shapes and forms is combined with various structural designs of ice cream handling kitchen utensils to provide working surfaces to which ice cream will not stick or adhere even after relatively long periods of continuous use.

To this end, the heads of my kitchen utensils may be formed of solid Teflon by compression or injection molding or by any other suitable method, or a Teflon coating may cover and be bonded to the exposed working surfaces of the utensils. In the latter case, the head of the utensils may be formed of a metal, wood, plastic or glass and the coating of Teflon applied by any one of the methods well-known in the art. For example, the head may be either dipped into a bath of Teflon or sprayed with a liquid Teflon and then placed in an oven and baked at about 575-750° F. until the Teflon coating hardens.

In the drawing, various examples of my invention are illustrated. In FIGURE 1, a preferred form of ice cream scoop is represented by the numeral 10. The scoop 10 includes a relatively thin-walled, hollow, hemispherical, cup-shaped head 12 and an elongated handle 14 projecting from the outside of the head to provide hand-holding means for using the ice cream scoop. The handle 14 is hollowed at top and bottom to reduce its weight and a hole 16 is disposed therethrough to provide means for hanging the scoop to a hook or other fixed attachment when not in use.

As previously indicated, the head 12 of the scoop may be formed of solid Teflon and the handle 14 of a rigid material such as metal screwed or otherwise secured to the head. Preferably, however, the scoop 10 is of a one-piece construction formed of a lightweight metal such as cast aluminum and the head 12 is completely covered with a thin coating 18 of Teflon.

The Teflon-covered inner and outer surfaces 20 and 22 of the head 12 are the primary work surfaces of the scoop and converge together at the periphery of the head to form a relatively thin and pointed, Teflon-covered, annular lip 24 which acts as a leading cutting edge for digging into and scooping ice cream from a large container. Due to the non-stick quality of the Teflon coating, ice cream does not adher to or become incrusted upon the lip 24 or outer surface 22 of the head 12 during the scooping of ice cream. The Teflon coating on the inner surface 20, meanwhile, prevents ice cream from sticking to the inside of the head 12 and allows the ice cream to slip freely from the head with a turning of the scoop.

In the preferred form of my invention, the free release of ice cream from the head 12 of the scoop 10 is further improved by the internal design of the head 12. In this regard, it should be noted that the inner surface 20 of the head 12 is not completely smooth. Rather, the inner surface includes a centrally located, convex, button-like projection 26. The button-like projection 26 forms an annular recess 28 between its periphery and the surrounding inner surface 20 of the head 12. This annular discontinuity provides a break between the outer surface of a scoop of ice cream formed in the head 12 and the inner surface 20 of the head which, surprisingly, in practice, has proven to material aid in the free and easy release of the ice cream from the head with a turning of the scoop.

An ice cream scoop having even greater non stick and release characteristics is illustrated in FIGURE 3 and represented generally by a number 30. The scoop 30 like the scoop 10 includes a generally cup-shaped head 32 and an elongated handle 34 projecting from the rear of the head. As previously indicated, the head 32 may be formed of solid Teflon and the handle 34 screwed or otherwise secured thereto. Preferably, however, the scoop 30 is of single-piece construction and formed of a lightweight metal, such as aluminum, and the exposed surfaces of the head 32 coated with a thin coating 36 of Teflon.

The form of the head 32 differs somewhat from the head 12 of the scoop 10. Rather than being hemispherical, the head 32 is slightly elongated in the direction of the handle 34. Also, the right and left sides of the head 32 are cutaway or relieved at 38 and 40, respectively, to reduce the head surface area contacting a scoop of ice cream formed within the hollow of the head.

As in the scoop 10, the concave inner and convex outer surfaces of the head 32 are the primary work surfaces of the scoop 30 and converge at their periphery to a relatively thin, Teflon-covered, forward lip 42. The lip 42 acts as a relatively sharp, leading cutting edge for digging into and scooping ice cream from a larger container. The Teflon coating over the lip 42 aids the lip in cleanly cutting into the ice cream while the Teflon coating over the outer surface of the head 32 prevents the sticking of ice cream to provide a clean scooping of ice cream from the container. Likewise, the coating of Teflon on the concave inner surface of the head 32 prevents the ice cream from sticking to the inside of the head and allows the ice cream to freely slip and release from the head upon a turning of the scoop.

The easy release of ice cream from the head 32 is, as previously mentioned, improved by the cutaway shape of the right and left sides of the head in that a smaller surface area contacts the ice cream within the head. The free release of the ice cream is further aided by the internal shape of the inner surface of the head and, in particular, by the inclusion of a convex button-like projection 44 from the central, inner surface of the head and a vertically extending ridge 46 along the inner rear wall of the head. The button-like projection 44 defines an annular recess 48 between its periphery and the surrounding inner surface of the head 32. This annular discontinuity in the inner surface of the head provides a break between the surface of a scoop of ice cream formed within the head and the inner surface of the head and, as with the scoop 10, has proven to materially aid in the easy and clean releas of the ice cream from the head. The discontinuity provided by the ridge 46 is still a further improvement in this regard in that it provides a sharp deviation in the surface of the scoop of ice cream formed within the head 32 and upon a turning of the head 32 immediately releases from the surrounding ice cream to foster a release of the ice cream from the inner surfaces of the head surrounding the ridge.

Another utensil commonly employed in the handling and dispensing of ice cream is the ice cream spade. An ice cream spade formed in accordance with the features of my invention is illustrated in FIGURE 4 and represented in general by the numeral 50. The spade 50 includes a relatively thin, slightly curved, spade head 52 and an elongated handle 54 projecting from a rear of the head 52. The head 52 may be formed of a solid Teflon and the handle 54 screwed or otherwise secured to the head. Preferably, however, the spade 50 is of a single-piece construction formed of a lightweight metal, such as aluminum, and the head 52 is covered with a thin coating 56 of Teflon.

The Teflon-covered upper surface 58 of the head 52 is slightly concave while the lower surface 60 is slightly convex and joins the top surface at an upwardly turned and slightly rounded forward lip 62. The curved design of the head 52 allows the head to both dig into a container of ice cream and to also effectively scoop relatively large chunks of ice cream from the container.

The Teflon coating along the lip 62 and over the outer surface 60 aids in the smooth entry and exit of the spade head into and from the container and prevents ice cream from adhering to the spade. Likewise, the Teflon coating on the inner surface 58 insures a free and clean release of ice cream from the spade head upon a turning of the spade.

In view of the foregoing, it is appreciated that the present invention provides simple, low cost kitchen utensils for handling and dispensing ice cream and the like having working surfaces to which ice cream does not stick or become incrusted even after relatively long periods of continuous use.

In the foregoing specification, specific embodiments have been described in detail to illustrate the features of my invention. The embodiments have been described and are in fact designed preferably to handle and dispense ice cream and the like. It should be noted in passing, however, that each of the utensils may be used to handle food products other than ice cream. In particular, the ice cream scoops illustrated in FIGURES 1 and 3 may be advantageously employed as scoops in the dispensing of hot, sticky food dishes such as rice, macaroni, mashed potatoes, and the like, where a non-stick scooping head is desired. The ice cream spade illustrated in FIGURE 4, by the same token, may be utilized to dispense hot foods and is particularly adapted to use as a spatula for handling fried foods, hot cakes and the like.

Further, my invention provides an improved utensil for handling foodstuffs when only the inner or upper surface of the head is coated with Teflon.

Although specific designs have been described, various changes and modifications may occur to those skilled in the art without departing from the spirit of my invention. Therefore, I intend that my invention be limited in scope only by the following claims.

I claim:
1. An ice cream-handling utensil, comprising:
an ice cream scooping head having a cavity therein;
a flat button-like projection from the base of said cavity defining a shallow annular recess between the periphery of said projection and the surrounding inner surface of said cavity;
a handle extending from outside of said head;
and a coating of polytetrafluorethylene over and bonded to exposed surfaces of said head and said projection.

2. An ice cream scoop, comprising:
a hollow, generally hemispherical scooping head having a relatively thin, outer lip and a centrally located, flat, button-like projection from its inner surface defining a shallow annular recess between the periphery of said projection and the surrounding inner surfaces of said head;
and a coating of polytetrafluorethylene over and bonded to the exposed surfaces of said head.

3. An ice cream-handling utensil, comprising:
a hollow, generally cup-shaped scooping head having cutaway right and left sidewalls between front and rear portions of said head;
a centrally located, flat, button-like projection from an inner surface of said head defining a shallow annular recess between the periphery of said projection and the surrounding inner surface of said head;
a vertically extending ridge protruding from the inner surface of said rear portion of said head;
a handle extending from said rear portion of said head;
and a coating of polytetrafluorethylene over and bonded to the exposed surfaces of said head, said button-like projection and said ridge.

4. An ice cream-handling utensil, comprising:
an ice cream scooping head having a cavity therein for scooping;
a flat, button-like projection from the base of said cavity defining a shallow annular recess between the periphery of said projection and the surrounding inner surface of said cavity;

a handle extending from an outside of said head;

and a coating of polytetrafluorethylene over and bonded to the exposed surfaces of said cavity and said projection.

5. An ice cream-handling utensil, comprising:

a hollow, generally cup-shaped scooping head having cutaway right and left sidewalls and a centrally located, flat, button-like projection from its inner surface defining a shallow annular recess between the periphery of said projection and surrounding inner surfaces of said head;

and a coating of polytetrafluorethylene over and bonded to the inner surfaces of said head.

References Cited
UNITED STATES PATENTS

| | | | |
|---|---|---|---|
| 2,878,659 | 3/1959 | Prance et al. | 62—357 |
| 1,432,798 | 10/1922 | Spence | 15—236 X |
| 1,857,685 | 5/1932 | Friedman | 107—48 |
| 2,160,023 | 5/1939 | Kelly | 107—48 |
| 2,174,388 | 9/1939 | Myers | 107—48 X |
| 2,669,194 | 2/1954 | Brown | 107—48 |
| 3,001,486 | 9/1961 | Duncan et al. | 107—40 |
| 3,059,279 | 10/1962 | Rossi | 107—19 X |
| 2,890,122 | 6/1959 | Katon | 107—19.2 X |
| 3,205,837 | 9/1965 | Fay | 107—8 |

WILLIAM I. PRICE, *Primary Examiner.*